US012681855B1

(12) United States Patent (10) Patent No.: US 12,681,855 B1

Gilad et al. (45) Date of Patent: Jul. 14, 2026

(54) ARCHITECTURE AND METHOD FOR A HYBRID VIRTUAL-PHYSICAL CACHE

(71) Applicant: Next Silicon Ltd, Givatayim (IL)

(72) Inventors: Yiftach Gilad, Givat Ada (IL); Liron Zur, Haifa (IL); Gleb Panarin, Netanya (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/419,004

(22) Filed: Dec. 14, 2025

(51) Int. Cl.
    G06F 12/0802 (2016.01)
(52) U.S. Cl.
    CPC ...... G06F 12/0802 (2013.01); G06F 2212/65 (2013.01)
(58) Field of Classification Search
    CPC ...................... G06F 312/0802; G06F 2212/65
    See application file for complete search history.

(56) References Cited

U.S. PATENT DOCUMENTS

| | | | | | |
|---|---|---|---|---|---|
| 5,301,298 | A | * | 4/1994 | Kagan | ................. G06F 12/0859 |
| | | | | | 711/143 |
| 5,717,898 | A | * | 2/1998 | Kagan | ................. G06F 12/1045 |
| | | | | | 711/E12.051 |
| 6,175,906 | B1 | * | 1/2001 | Christie | .............. G06F 12/1063 |
| | | | | | 711/144 |
| 6,820,195 | B1 | * | 11/2004 | Shepherd | ................ G06F 9/383 |
| | | | | | 712/E9.034 |
| 2009/0222625 | A1 | * | 9/2009 | Ghosh | ................. G06F 12/0802 |
| | | | | | 711/3 |
| 2013/0185520 | A1 | * | 7/2013 | Dieffenderfer | ...... G06F 12/1045 |
| | | | | | 711/144 |

OTHER PUBLICATIONS

Geeksforgeeks, Virtually Indexed Physically Tagged (VIPT) Cache, Jul. 2025, available at: https://www.geeksforgeeks.org/computer-organization-architecture/virtually-indexed-physically-tagged-vipt-cache/ (Year: 2025).*

* cited by examiner

*Primary Examiner* — Ryan Bertram

(57) ABSTRACT

A computing system comprising: a cache, comprising a virtual tag storage and a physical tag storage, where each cache line is identified for load operations by a virtual tag and for store operations by a physical tag; a cache access controller; a snoop access circuitry; and a miss controller; wherein, in response to receiving a load operation comprising a virtual address, the cache access controller: accesses the cache to perform the load operation comprising looking up a virtual tag computed using the virtual address; and upon failing to identify the virtual tag value in the virtual tag storage, provides the load operation to the miss controller; and wherein the miss controller in response to receiving the load operation from the access controller, initiates an aliasing snoop to the cache by the snoop access circuitry, the aliasing snoop comprising looking up a physical tag computed using a corresponding physical address.

20 Claims, 5 Drawing Sheets

100

200A

200B

110
Lower-level
Cache

231
Ways

WAY0    WAY1    WAY2    WAY3

SET0     CL1

SET1

230
Cache
Sets

SET2              CL2

SETN-2

SETN-1

115
Data Entries

WAY0   WAY1   WAY2   WAY3

SET0      VT1

SET1

SET2           VT2B

SETN-2

SETN-1

111
Storage of Virtual Tags

WAY0   WAY1   WAY2   WAY3

SET0      PT1

SET1

SET2           PT2

SETN-2

SETN-1

112
Storage of Physical Tags

400

ARCHITECTURE AND METHOD FOR A HYBRID VIRTUAL-PHYSICAL CACHE

BACKGROUND

Some embodiments described in the present disclosure relate to computer system architecture, and, more specifically, but not exclusively, to a cache memory system.

As used herein, the term "cache" refers to a high-speed memory subsystem positioned between a processor and main memory to temporarily store frequently accessed data and instructions. As used herein, the term "virtual memory address" refers to a memory address generated by a processor that requires translation to a corresponding physical memory address before accessing actual memory locations. For brevity, henceforth the term "virtual address" is used to mean "virtual memory address" and the terms are used interchangeably. Similarly, the term "physical address" is used to mean "physical memory address" and the terms are used interchangeably.

Modern computing systems employ cache hierarchies to bridge the performance gap between fast processors and relatively slower main memory systems. As used herein, the term "cache hierarchy" refers to multiple levels of cache memory organized by order of access from the processor core, with lower-level caches accessed before higher-level caches in the memory access sequence. As used herein, the term "cache line" refers to a unit of data transfer between memory areas and a cache and between cache levels. A cache line may include, besides data, associated metadata including validity bits and address tags. A cache may be organized in a plurality of cache lines.

Cache systems are accessed using memory addresses that identify one or more requested cache lines. Cache systems access stored data through indexing and tagging operations that determine both the location and identity of requested cache lines. As used herein, the term "cache indexing" refers to the process of selecting which part of a cache may contain a particular memory address, typically accomplished by using a subset of address bits to identify among multiple cache sets. As used herein, the term "cache set" refers to a collection of cache storage locations, i.e. a subset of the plurality of cache lines of the cache, that can hold data for memory addresses sharing common index bits, wherein the cache indexing process uses predetermined address bits to select among the available cache sets. Cache systems organize storage into multiple cache sets to enable efficient address mapping and parallel access operations, optionally with each cache set containing multiple cache ways to provide set-associative storage capabilities. As used herein, the term "cache way" refers to one of multiple storage locations within a cache set, wherein each way can hold a complete cache line, optionally along with its associated tag and validity information.

As used herein, the term "cache tagging" refers to the process of identifying specific cache lines within a selected cache set by comparing stored tag values against corresponding portions of the requested memory address. The indexing process determines the cache set location where a particular memory address may reside, while the tagging process identifies the specific cache way within that set containing the requested data by matching tag portions of the memory address against stored tag values.

The term "cache hit" refers to a condition where a memory access request successfully locates the requested data within a cache memory system, optionally enabling a processor to retrieve data directly from the cache without accessing higher levels of the memory hierarchy. Cache hits occur when the requested memory address matches a valid tag entry in the cache.

The term "cache miss" refers to a condition where a memory access request fails to locate the requested data within a cache memory system, optionally requiring the processor to access higher levels of the memory hierarchy to retrieve the data. Cache misses occur when the requested memory address does not match any valid tag entry in the cache or when the corresponding cache line does not contain valid data. A cache miss may result in increased access latency as the processor must retrieve data from slower components of a memory system of the computer system, such as higher-level caches or main memory.

As used herein, the term "address aliasing" refers to a condition in systems that use virtual addresses where multiple virtual addresses map to the same physical memory location through the system's address translation process. Address aliasing occurs when different virtual addresses in the same or different address spaces are translated to identical physical addresses, for example resulting from memory regions shared among one or more software applications, memory-mapped files, or dynamic memory mapping operations performed by the operating system. Address aliasing additionally occurs during virtual address space management operations, for example when an operating system invalidates virtual address mappings while preserving the associated physical memory contents, optionally resulting in situations where valid physical data exists in cache memory without corresponding valid virtual address tags.

Whether cache indexing, and additionally or alternatively cache tagging, for accessing a cache use a virtual or a physical address scheme may impact performance and/or cache coherency.

Utilizing virtual addresses for both cache set selection (virtual indexing) and tag comparison (virtual tagging) operations, referred to as VIVT, is a faster way to access a cache compared to physical indexing and physical tagging (PIPT). In PIPT a virtual address must be translated to a physical address before the cache can be accessed, introducing additional latency compared to using VIVT. However, while VIVT is faster than PIPT, VIVT suffers from address aliasing, where more than one virtual address maps to the same physical address. In load operations address aliasing can cause a cache miss even though the data exists physically in the cache under a different virtual tag, resulting in a performance hit for accessing the next memory access level. As a result, after store operations there is a risk of data corruption, for example when retrieving new data from a higher memory hierarchy after modifying data in the cache in a store operation. The retrieved new data may not be updated with the value written by the store operation, resulting in data corruption. Aliasing is considered a relatively rare condition; however its implications may impact system integrity and therefore is either avoided or handled.

As used herein, the term 'snoop' or 'snooping' refers to a cache coherence mechanism whereby a cache associated with a processor in a multiprocessor system can be accessed by another processor in the multiprocessor system. A snoop access circuitry provides a secondary access path to the cache, at least partially distinct from the primary access path used by the processor associated with the cache, enabling other processors to retrieve and additionally or alternatively modify cache contents to maintain data consistency throughout the system.

SUMMARY

It is an object of some embodiments described in the present disclosure to provide a system, a processor and a method for an improved cache memory system that achieves the performance benefits of virtual addressing while maintaining data coherency under address aliasing conditions. Some embodiments described in the present disclosure address the technical challenge of detecting and handling address aliasing in virtual cache systems without requiring expensive duplication of physical tag storage or access ports into the cache. Such embodiments comprise a lower level cache with both virtual and physical indexing and tagging capabilities, wherein load operations utilize virtual indexing and tags for rapid access while store operations employ physical indexing and tags for coherency maintenance. Such embodiments additionally comprise cache miss controller circuitry configured to detect potential aliasing conditions by leveraging existing snoop mechanisms originally designed for inter-processor cache coherency protocols, optionally eliminating the need for dedicated aliasing detection hardware while maintaining system performance and data integrity.

Some embodiments described in the present disclosure provide technical advantages over conventional cache architectures by achieving performance benefits of virtual addressing while avoiding hardware duplication costs associated with conventional aliasing detection mechanisms.

With respect to access latency, the use of virtual address indexing and virtual tag comparison for load operations enables such embodiments to achieve lower cache access latency compared to PIPT cache systems. In PIPT systems, every cache access requires completion of virtual-to-physical address translation before cache lookup operations can begin, introducing translation latency into the critical path of memory access operations. In contrast, some embodiments described herein perform cache set selection and tag comparison operations using virtual addresses for load operations, wherein cache control circuitry initiates cache lookup operations upon receipt of virtual addresses without waiting for address translation completion, enabling cache lookup to proceed in parallel with address translation rather than sequentially after translation. As load operations typically constitute a substantial portion of memory access operations in computing systems, optimizing load operation latency through selective application of virtual addressing to the more frequent operation type provides significant benefit to overall system performance compared to approaches that impose translation delays uniformly on all memory operations.

With respect to hardware cost, the configuration of cache miss controller circuitry to employ snoop mechanisms for aliasing detection enables such embodiments to eliminate physical tag duplication overhead required by conventional VIVT cache systems that detect aliasing through parallel physical tag lookup mechanisms. Conventional aliasing-aware VIVT systems require either duplicate physical tag storage arrays accessible concurrently with virtual tag arrays, or additional read ports into shared tag memory to enable concurrent virtual and physical tag comparison on every cache access. Such duplication increases silicon area, routing complexity, and manufacturing cost. In contrast, some embodiments described herein employ cache miss controller circuitry configured to initiate snoop operations using physical addresses upon virtual cache misses, thereby reusing existing snoop access circuitry and existing physical tag storage originally provided for inter-processor cache coherency protocols, and thereby detecting aliasing conditions without requiring dedicated aliasing detection hardware, additional tag storage arrays, or supplementary access ports beyond those already present for coherency operations.

Specifically, when a load operation using virtual addressing results in a cache miss, the cache miss controller circuitry obtains the physical address corresponding to the missed virtual address from the translation lookaside buffer and initiates a snoop operation using this physical address. This snoop operation queries cache entries using physical indexing and physical tag comparison—the same mechanism employed for inter-processor coherency—thereby detecting whether the requested data resides in cache under a different virtual address (an aliasing condition) without requiring dedicated aliasing detection circuitry.

With respect to power consumption, the selective triggering of physical tag lookups only upon virtual cache misses rather than on every cache access enables such embodiments to reduce dynamic power consumption compared to conventional VIVT systems that perform parallel physical tag lookups on every cache access. Such conventional systems consume power for physical tag array access, comparison circuitry operation, and associated data path switching on every cache access regardless of whether aliasing conditions exist. In contrast, some embodiments described herein employ cache miss controller circuitry configured to trigger physical tag lookup operations through the snoop mechanism only upon virtual cache misses, wherein physical tag array access occurs conditionally based on virtual tag comparison results rather than unconditionally on every memory operation, exploiting both the statistical rarity of aliasing conditions and the substantial frequency of load operations to avoid unnecessary power-consuming lookup operations. Since load operations constitute a substantial portion of memory accesses and benefit from virtual-only tag lookup, the system avoids physical tag access for a substantial portion of memory operations, achieving substantial reduction in tag array access frequency and associated power consumption compared to systems performing physical lookups on every access.

With respect to data integrity, the combination of physical address indexing and physical tagging for store operations with snoop-based aliasing detection for load misses enables such embodiments to maintain cache coherency under address aliasing conditions without requiring operating system intervention or application-level aliasing prevention mechanisms. Conventional VIVT systems without aliasing detection risk data corruption when multiple virtual addresses map to identical physical locations, as store operations to one virtual address may update cache contents that remain accessible under a different virtual address with stale data. Conventional solutions either restrict operating system memory management to prevent aliasing (limiting flexibility) or require expensive hardware for continuous aliasing monitoring. In contrast, some embodiments described herein employ cache control circuitry configured to use physical address bits for cache set selection and physical tags for tag comparison when processing store operations, ensuring that store operations update cache entries identified by physical address, and further employ cache miss controller circuitry configured to initiate snoop operations using physical addresses when load operations result in virtual tag misses, thereby detecting whether requested data resides in cache under an aliased virtual address. This combination ensures that store operations update cache contents identifiable by physical address while load operations benefit from virtual addressing speed, thereby preventing data corruption while maintaining operating system flexibility in memory mapping operations. This approach applies coherency overhead selectively to store operations where data corruption risks arise, while allowing the more frequent load operations to benefit from virtual addressing performance advantages.

The foregoing and other objects are achieved by the features of the independent claims. Further implementation forms are apparent from the dependent claims, the description and the figures.

According to a first aspect, a computing system comprises: a lower level (L1) cache associated with at least one first processing circuitry, configured to store a first plurality of cache lines and comprising a storage of virtual tags (L1 storage of virtual tags) and a storage of physical tags (L1 storage of physical tags), where each of the first plurality of cache lines is identified for load operations by a first virtual tag in the L1 storage of virtual tags and for store operations by a first physical tag in the L1 storage of physical tags; a lower cache access controller circuitry (L1 access controller), configured to access the L1 cache by the at least one first processing circuitry; a snoop access circuitry associated with the at least one first processing circuitry, configured to access the L1 cache by at least one second processing circuitry; and a lower cache miss controller circuitry (L1 miss controller); wherein the L1 access controller is further configured to, in response to receiving from the at least one first processing circuitry a load operation comprising a virtual memory address: access the L1 cache (L1 access) to perform the load operation comprising looking up in the L1 storage of virtual tags a virtual tag value computed using the virtual memory address; and upon failing to identify the virtual tag value in the L1 storage of virtual tags (L1 virtual miss), provide the load operation to the L1 miss controller; and wherein the L1 miss controller is configured to, in response to receiving the load operation from the L1 access controller, initiate another access to the L1 cache by the snoop access circuitry (L1 aliasing snoop), the L1 aliasing snoop comprising looking up in the L1 storage of physical tags a physical tag value computed using a first physical memory address corresponding to the virtual memory address.

According to a second aspect, a method for memory caching, comprises: in response to receiving from at least one first processing circuitry a load operation comprising a virtual memory address: accessing a lower level (L1) cache associated with at least one first processing circuitry to perform the load operation, where the L1 cache is configured to store a first plurality of cache lines and comprises a storage of virtual tags (L1 storage of virtual tags) and a storage of physical tags (L1 storage of physical tags), where each of the first plurality of cache lines is identified for load operations by a first virtual tag in the L1 storage of virtual tags and for store operations by a first physical tag in the L1 storage of physical tags, where performing the load operation comprises looking up in the L1 storage of virtual tags a virtual tag value computed using the virtual memory address; upon failing to identify the virtual tag value in the L1 storage of virtual tags (L1 virtual miss), providing the load operation to a lower cache miss controller circuitry (L1 miss controller); and in response to receiving the load operation, initiating by the L1 miss controller another access to the L1 cache (L1 aliasing snoop) by a snoop access circuitry, the L1 aliasing snoop comprising looking up in the L1 storage of physical tags a physical tag value computed using a first physical memory address corresponding to the virtual memory address.

According to a third aspect, a processor comprises: a lower level (L1) cache associated with at least one first processing circuitry, configured to store a first plurality of cache lines and comprising a storage of virtual tags (L1 storage of virtual tags) and a storage of physical tags (L1 storage of physical tags), where each of the first plurality of cache lines is identified for load operations by a first virtual tag in the L1 storage of virtual tags and for store operations by a first physical tag in the L1 storage of physical tags; a lower cache access controller circuitry (L1 access controller), configured to access the L1 cache by the at least one first processing circuitry; a snoop access circuitry associated with the at least one first processing circuitry, configured to access the L1 cache by at least one second processing circuitry; and a lower cache miss controller circuitry (L1 miss controller); wherein the L1 access controller is further configured to, in response to receiving from the at least one first processing circuitry a load operation comprising a virtual memory address: access the L1 cache (L1 access) to perform the load operation comprising looking up in the L1 storage of virtual tags a virtual tag value computed using the virtual memory address; and upon failing to identify the virtual tag value in the L1 storage of virtual tags (L1 virtual miss), provide the load operation to the L1 miss controller; and wherein the L1 miss controller is configured to, in response to receiving the load operation from the L1 access controller, initiate another access to the L1 cache (L1 aliasing snoop) by the snoop access circuitry, the L1 aliasing snoop comprising looking up in the L1 storage of physical tags a physical tag value computed using a first physical memory address corresponding to the virtual memory address.

With reference to the first and second aspects, in a first possible implementation of the first and second aspects the L1 access controller is further configured to provide the L1 miss controller with the virtual tag value and the physical tag value.

With reference to the first and second aspects, in a second possible implementation of the first and second aspects the snoop access circuitry is further configured to, upon a successful look up of the physical tag value in the L1 storage of physical tags (L1 aliasing snoop success): retrieve from the L1 cache a respective cache line identified by the physical tag value; and provide data from the respective cache line to the L1 miss controller. Optionally, the snoop access circuitry is further configured to provide cache line state information from the respective cache line to the L1 miss controller. Providing the L1 miss controller with cache line state information allows preserving the cache line's state even if it is moved in the L1 cache memory. Optionally, the snoop access circuitry is further configured to invalidate the respective cache line in the L1 storage of virtual tags and in the L1 storage of physical tags. Invalidating the respective cache line after retrieving the data allows using existing mechanisms to update the L1 cache with correct tags to resolve the address aliasing, simplifying design and reducing size of the circuitry required to implement the solution. Optionally, the L1 miss controller is further configured to: store the data of the respective cache line in another cache line of the first plurality of cache lines of the L1 cache, where the other cache line is selected according to a cache management policy; update the L1 storage of physical tags to identify the other cache line by the physical tag value; and update the L1 storage of virtual tags to identify the other cache line by the virtual tag value computed using the virtual memory address of the load operation. Storing the data in the L1 cache with the virtual tag value computed using the virtual memory address of the load operation allows resolving the address aliasing, allowing subsequent load accesses using the virtual memory address to identify the virtual tag value in the storage of virtual tags, thus reducing latency of subsequent load accesses using the virtual memory address. Optionally, the other cache line, selected according to the cache management policy, is the respective cache line. Optionally, the system further comprises a buffer, for storing local data retrieved by accessing the L1 cache, before sending the local data to at least one other processing circuitry. Optionally, providing the data from the respective cache line to the L1 miss controller comprises storing the data in the buffer. Optionally, the snoop access circuitry is further configured to indicate to the L1 miss controller a failure to update the L1 cache. Optionally, the L1 miss controller is further configured to issue a lower level cache update (L1 cache update) in response to the indication from the snoop access circuitry failing to update the L1 cache. Optionally, storing the data of the respective cache line in the other cache line, updating the L1 storage of physical tags and updating the L1 storage of virtual tags is in response to the L1 cache update. Storing the data of the respective cache line in the other cache line, updating the L1 storage of physical tags and updating the L1 storage of virtual tags in response to the L1 cache update allows using existing cache management mechanisms for updating the L1 cache from a higher memory level, reducing cost of implementation and simplifying implementation compared to designing additional circuitry to implement these operations.

With reference to the first and second aspects, in a third possible implementation of the first and second aspects an L1 aliasing snoop success comprises identifying the physical tag value in a location in the L1 storage of physical tags.

With reference to the first and second aspects, or the third implementation of the first and second aspects, in a fourth possible implementation of the first and second aspects the snoop access is further configured to, in response to the L1 aliasing snoop success, update the L1 storage of virtual tags to identify the respective cache line by the virtual tag value computed using the virtual memory address of the load operation. Optionally, the first plurality of cache lines is organized in the L1 storage of virtual tags in a plurality of cache sets each cache set comprising a plurality of ways. Optionally, identifying the virtual tag value in the L1 storage of virtual tags comprises identifying an association between the virtual tag value and an identified way of the respective plurality of ways of an identified cache set of the plurality of cache sets. Optionally, the snoop access circuitry is configured to update the L1 storage of virtual tags subject to identifying that the location in the L1 storage of physical tags where the physical tag value was identified corresponds to the identified way associated with the virtual tag value. Updating the L1 storage of virtual tags by the snoop access circuitry reduces latency in serving the load operation when the load operation is dispatched.

With reference to the first and second aspects, in a fifth possible implementation of the first and second aspects the computing system further comprises a higher level (L2) cache, configured to store a second plurality of cache lines and comprising another storage of physical tags (L2 storage of physical tags), where each of the second plurality of cache lines is identified for both load and store operations by another physical tag in the L2 storage of physical tags and where the L2 cache is a next level memory with relation to the L1 cache. Optionally, the L1 miss controller is further configured to initiate an access to the L2 cache (L2 access) using the physical tag value, concurrently with the L1 aliasing snoop. Optionally, the L1 access controller is further configured to, upon an unsuccessful look up of the physical tag value in the L1 storage of physical tags when executing the L1 snoop access, respond to the load operation according to an outcome of another access to a next memory level after the L1 cache. Optionally, the computing system further comprises a load operation queue for storing one or more pending load operations. Optionally, the L1 access controller is configured to receive the load operation from the load operation queue. Optionally, the L1 aliasing snoop to the L1 cache is performed concurrently with the L1 access controller accessing the L1 cache in response to another load operation received from the load operation queue. Performing the L1 aliasing snoop concurrently with the L1 access controller accessing the L1 cache in response to another load operation increases the system's total throughput, allowing the other load operation not to be blocked until completion of the L1 aliasing snoop for the load operation.

With reference to the first and second aspects, in a sixth possible implementation of the first and second aspects the computing system further comprises a translation circuitry configured to translate virtual memory addresses to physical memory addresses. Optionally, the first physical memory address is computed by the translation circuitry using the virtual memory address. Optionally, the translation circuitry is a memory management unit.

With reference to the first and second aspects, in a seventh possible implementation of the first and second aspects the computing system further comprises a snoop filter storage comprising a plurality of filter entries, each filter entry of the plurality of filter entries corresponding to one of the first plurality of cache lines. Optionally, performing the L1 aliasing snoop is subject to: computing an address identification value using the first physical memory address; and identifying the address identification value in the snoop filter storage. Performing the L1 aliasing snoop subject to identifying the address identification value in the snoop filter storage reduces the likelihood of the L1 snoop access failing, thus reducing total latency of memory accesses by reducing the likelihood of executing an unnecessary L1 aliasing snoop. Optionally, computing the address identification value comprises applying a hash function to the first physical memory address. Using a hash function is a simple and quick computation, reducing latency of preparing for the L1 aliasing snoop and thus reducing the total latency of performing the L1 aliasing snoop.

With reference to the first and second aspects, in an eighth possible implementation of the first and second aspects the L1 access controller is further configured to: in response to a store operation comprising the virtual memory address, access the L1 cache to perform the store operation using the physical tag value computed using the first physical memory address. Serving a store operation using the physical tag reduces a likelihood of cache corruption.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the accompanying drawings, like reference numerals are used consistently across the figures to denote like elements or components. This consistency is intended to aid in the understanding of the embodiments and should not be construed as limiting the scope of the invention to the specific configurations illustrated.

DETAILED DESCRIPTION

Figure 1:
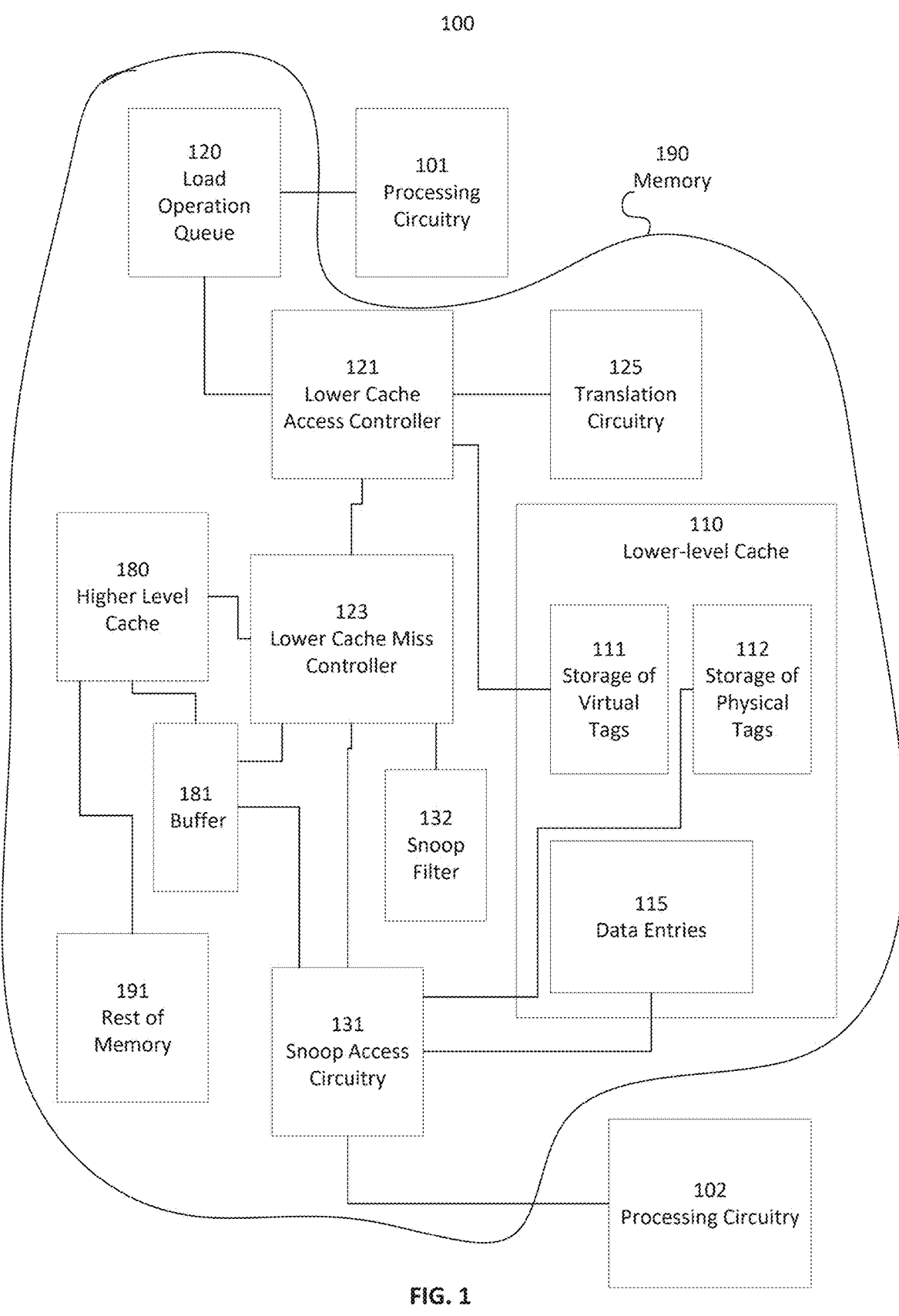
FIG. 1 is a schematic block diagram of an exemplary system, according to some embodiments.

Some embodiments described in the present disclosure relate to computer processor microarchitecture, and, more specifically, but not exclusively, to a cache memory system.

Different memory operation types have different performance requirements and different coherency requirements. Load operations retrieve data from memory without modifying memory contents, while store operations both modify memory contents and create coherency requirements when multiple virtual addresses may reference identical physical locations. Conventional cache architectures apply uniform access mechanisms to all operation types, imposing identical performance and coherency overhead on loads and stores despite their differing characteristics.

The technical challenge is compounded by multiprocessor coherency requirements. Snoop-based coherency protocols in multi-processor systems require physical addressing to maintain cache coherency across processor cores that may employ different virtual address mappings to shared physical memory. Conventional cache architectures treat aliasing detection and inter-processor coherency as separate problems requiring independent hardware mechanisms, rather than recognizing potential integration opportunities.

The present disclosure, in some embodiments described herewithin, addresses technical problems that arise from limitations in existing cache memory architectures that assume unified tagging schemes for both load and store operations. Cache designs that employ identical indexing and tagging approaches for both read (load) and write (store) operations constrain system performance and additionally or alternatively require expensive hardware duplication to address aliasing conditions in virtual cache implementations, i.e. a cache that is accessed using a virtual address. Specifically, physically-addressed cache systems require completion of virtual-to-physical address translation before cache lookup can commence, introducing translation latency into every memory access operation. Virtually-addressed cache systems avoid this translation delay but create address aliasing conditions wherein multiple virtual addresses map to identical physical locations, requiring aliasing detection mechanisms. Conventional aliasing detection in virtual caches employs duplicate physical tag storage or additional memory ports to enable concurrent virtual and physical address comparison, substantially increasing silicon area and power consumption.

For brevity, the terms "virtual miss" and "virtual hit" are used herewithin to describe cache miss and cache hit conditions respectively, when the cache is accessed using virtual indexing and virtual tagging. Similarly, the terms "physical miss" and "physical hit" are used herewithin to describe cache miss and cache hit conditions respectively, when the cache is accessed using physical indexing and physical tagging.

VIVT provides faster cache access latency than PIPT, by enabling cache lookup operations to proceed in parallel with virtual-to-physical address translation; however, systems that use VIVT suffer from address aliasing conditions, where multiple virtual addresses map to identical physical memory locations. Address aliasing in load operations can cause virtual cache misses even when the requested data exists in the cache under a different virtual tag, resulting in unnecessary performance penalties from accessing higher levels of the memory hierarchy. More critically, aliasing in store operations creates substantial risk of data corruption when multiple virtual addresses reference the same physical location but are associated with different cache entries.

Some existing systems address this problem by explicitly detecting address aliasing and issuing a cache miss indication (i.e. accessing a next level in the memory system, when the memory system is organized in a hierarchy of levels) only when no aliasing is detected. One possible approach to detect address aliasing comprises parallel physical tag lookup during cache access, requiring expensive duplication of physical tag storage arrays or additional access ports to shared tag memory, significantly increasing hardware complexity and power consumption. When aliasing is detected through parallel lookup mechanisms, such existing systems require complex virtual tag update procedures, optionally involving cache line invalidation and re-fetching operations or specialized replacement mechanisms that add substantial latency overhead. The technical challenge is compounded by the need to maintain cache coherency across multiple processor cores in multiprocessor systems, where traditional snoop-based coherency protocols must coexist with aliasing detection mechanisms.

To solve these technical problems, some embodiments described in the present disclosure propose a novel approach that uses only virtual miss conditions to trigger miss handling in a low-level cache for load operations using virtual indexing and tagging, optionally avoiding the need for physical tag lookup in parallel with virtual lookup operations. The inventive approach, in some embodiments, does not attempt to detect aliasing during the initial cache access operation based on a virtual address, and instead leverages existing snoop mechanisms to detect aliasing conditions in the low-level cache after a virtual miss occurs therein. This approach eliminates the need for physical tag duplication while reusing hardware infrastructure already present for inter-processor cache coherency, optionally providing significant reductions in hardware cost and power consumption while maintaining or improving system performance.

For brevity, henceforth the term L1 is used to mean a lower-level cache, that is associated with one or more processing circuitries and is accessed by the one or more processing circuitries before accessing other levels of the one or more processing circuitries' memory system, for example a higher level cache or a memory component. Henceforth the terms "L1 cache" and "lower-level cache" are used interchangeably. In addition, for brevity henceforth the term L2 is used to mean a higher-level cache that is associated with the one or more processing circuitries and is accessed by the one or more processing circuitries after accessing the L1 cache, for example when accessing the L1 cache results in a cache miss. Henceforth the terms "L2 cache" and "higher-level cache" are used interchangeably.

It should be appreciated that as used herewithin, an L1 cache may be a first cache accessed by the one or more processing circuitries when accessing the memory system, however optionally the one or more processing circuitries access another cache before accessing the L1 cache. The terms "lower-cache" and "higher-cache" ("L1 cache" and "L2 cache", respectively) are relative to each other, defining a hierarchy between them with regards to the one or more processing circuitries within a memory system that may include one or more additional cache levels, before and additionally or alternatively after the L1 cache and the L2 cache in a hierarchy of cache levels of the memory system.

In some embodiments, a system comprises an L1 cache that is associated with one or more first processing circuitries. Optionally, the system is a multiprocessor system, such that the one or more first processing circuitries are at least some of a plurality of processing circuitries. Optionally, the L1 cache is configured to store a first plurality of cache lines. Optionally, each of the first plurality of cache lines is identified for load operations by a first virtual tag in the L1 storage of virtual tags. Optionally, the L1 cache comprises a storage of virtual tags, henceforth "L1 storage of virtual tags". Optionally, the L1 cache comprises a storage of physical tags, henceforth "L1 storage of physical tags". Optionally, each of the first plurality of cache lines is identified for store operations by a first physical tag in the L1 storage of physical tags.

Optionally, the system comprises a lower cache access controller circuitry. For brevity, henceforth the term "L1 access controller" is used to mean "lower cache access controller circuitry", and the terms are used interchangeably. Optionally, the L1 access controller is associated with the one or more first processing circuitries. Optionally the L1 access controller is configured to access the L1 cache by the one or more first processing circuitries. Optionally the system comprises a snoop access circuitry. Optionally, the snoop access circuitry is associated with the one or more first processing circuitries. Optionally, the snoop access circuitry is configured to access the L1 cache by one or more second processing circuitries. Optionally, the one or more second processing circuitries are at least some other of the plurality of processing circuitries. Optionally, the system comprises a lower cache miss controller circuitry. For brevity, the term "L1 miss controller" is used to mean "lower cache miss controller circuitry", and the terms are used interchangeably. Optionally, the L1 miss controller is associated with the one or more first processing circuitries.

Optionally, in response to receiving from the one or more first processing circuitries a load operation comprising a virtual memory address, the L1 access controller is further configured to access the L1 cache to perform the load operation. Optionally, accessing the L1 cache, henceforth the L1 access, comprises looking up in the L1 storage of virtual tags a virtual tag value that is computed using the virtual memory address. Optionally, upon an L1 virtual miss, i.e. failing to identify the virtual tag value in the L1 storage of virtual addresses, the L1 access controller is configured to provide the load operation to the L1 miss controller. Optionally, in response to receiving the load operation from the L1 access controller, the L1 miss controller is configured to initiate an L1 aliasing snoop, i.e. another access to the L1 cache by the snoop access circuitry. Optionally, the L1 aliasing snoop comprises looking up in the L1 storage of physical tags a physical tag value that is computed using a first physical memory address that corresponds to the virtual memory address. Optionally, the system further comprises a translation circuitry, for translating virtual memory addresses to physical memory addresses. Optionally, the translation circuitry is a memory management unit (MMU). Optionally, the translation circuitry is part of an MMU. Optionally, the translation circuitry comprises a translation lookaside buffer (TLB). Optionally, the first physical memory address is computed by the translation circuitry using the virtual memory address.

Initiating an L1 aliasing snoop by the L1 miss controller allows detection of an aliasing condition after a virtual miss in the L1 cache, as the L1 aliasing snoop uses physical tagging. As aliasing is a rare condition, most of the load accesses enjoy the benefit of accessing the cache using the virtual address, and accessing the cache using a physical address for the store operations ensures data integrity. The present solution allows reducing the negative impact to performance of aliasing detection, for example increased latency, by incurring this negative impact only when there is a virtual miss and therefore there is a potential for address aliasing.

Optionally, the system comprises a load operation queue for storing one or more pending load operations. Optionally, access to the L1 cache is via one or more access ports of the L1 cache. Optionally, the L1 access controller receives the load operation from the load operation queue, and accesses the L1 cache using at least one of the one or more access ports of the L1 cache. Optionally, the L1 aliasing snoop to the L1 cache is performed concurrently with the L1 access controller accessing the L1 cache in response to another load operation received from the load operation queue. For example, the L1 access controller may access the L1 cache in response to the other load operation using at least one first access port of the one or more access ports, while the snoop access circuitry accesses the L1 cache using at least one second access port of the one or more access ports, where the at least one first access port is not the at least one second access port. Performing the L1 access snoop concurrently to normal operation of the load operation queue reduces overall system latency in serving a plurality of memory accesses, compared to interleaving the L1 aliasing snoop with the normal operation of the load operation queue.

Optionally, the snoop access circuitry provides data from the L1 cache to the L1 miss controller. Optionally, the snoop access circuitry provides cache line state information from the L1 cache to the L1 miss controller. Optionally, the L1 miss controller handles the data from the L1 cache as if it were retrieved from a next level in the memory system. Thus, upon a successful lookup of the physical tag value in the L1 storage of physical tags (i.e., an L1 aliasing snoop success), the snoop access circuitry is optionally further configured to retrieve a respective cache line, identified by the physical tag value, from the L1 cache. Optionally, the snoop access circuitry is further configured to provide data from the respective cache line to the L1 miss controller, optionally in response to the load operation.

Optionally, the L1 access controller provides the L1 miss controller with the virtual tag value and the physical tag value, optionally in addition to the data. Providing the L1 miss controller with both the virtual tag value and the physical tag value allows the L1 miss controller to detect address aliasing and to update the L1 storage of virtual tags as needed in case aliasing is detected, preserving data integrity and reducing a likelihood of address aliasing in future accesses to same virtual address, thus increasing overall performance.

Optionally, when the snoop access circuitry identifies the L1 aliasing snoop success, i.e. identifies a physical hit in L1 cache following the L1 aliasing snoop, the snoop access circuitry provides the L1 miss controller with an indication of the L1 aliasing snoop success.

Optionally, in response to the indication of the L1 alias snoop success, the L1 miss controller is further configured to store data of the respective cache line in another cache line of the first plurality of cache lines. Optionally, the other cache line is selected according to a cache management policy, for example selecting a least recently used cache line. Another example is selecting the other cache line randomly from the first plurality of cache lines. Optionally, the cache management policy uses the physical tag value and additionally or alternatively the virtual tag value. Optionally, the other cache line is the respective cache line, i.e. the data of the respective cache line is stored in the respective cache line again. Optionally, the other cache line is different from the respective cache line. Optionally, the L1 miss controller updates the L1 storage of physical tags to identify the other cache line by the physical tag value. Optionally, the L1 miss controller updates the L1 storage of virtual tags to identify the other cache line by the virtual tag value that was computed using the virtual memory address of the load operation.

Optionally, in response to the indication of the L1 alias snoop success, the L1 miss controller updates the L1 storage of virtual tags to identify the respective cache line by the virtual tag value that was computed using the virtual address of the load operation. This may be done, for example, when the respective cache line has no valid virtual tag, for example after an operating system invalidation of memory pages by invalidating virtual tags in the L1 storage of virtual tags, for example after a page table change. Optionally, the respective cache line is identified in the L1 storage of virtual tags by an old virtual tag value, optionally of an old virtual address mapped to the physical address. This is an address aliasing condition. Optionally, the snoop access circuitry provides the L1 miss controller with data from the respective cache line. Optionally, the snoop access circuitry invalidates the old virtual tag value.

Optionally, when virtual indexing according to the virtual address results in a way different from the way that resulted in the L1 aliasing snoop hit, the snoop access circuitry invalidates the respective cache line in the L1 cache in the L1 storage of virtual tags.

In some embodiments, for example, but not limited to, when virtual indexing according to the virtual address results in a way different from the way that resulted in the L1 aliasing snoop hit, the present solution proposes using existing mechanisms for retrieving data from a next memory level in order to update the L1 cache and resolve the address aliasing.

In normal operation, when there is a cache miss when accessing the L1 cache, a status of the load operation on the load queue is set to block the load operation, indicating to a manager of the load queue not to dispatch the load operation, and optionally the L1 miss controller initiates an access to a next memory level after the L1 cache. Optionally, after new data is retrieved from the next memory level, the L1 miss controller issues a lower level cache update (L1 cache update). Optionally, in response to the L1 cache update, data retrieved from the next memory level is stored in the L1 cache and the L1 storage of virtual tags and the L1 storage of physical tags are updated accordingly. Optionally, the L1 miss controller triggers re-dispatching the load operation, allowing another attempt to serve the load operation from the L1 cache. Optionally, the L1 miss controller triggers re-dispatching the load operation by updating the status of the load operation on the load queue to indicate that the load operation may be dispatched. Optionally, the L1 miss controller triggers re-dispatching the load operation after the L1 cache update completes. Optionally, the L1 miss controller triggers re-dispatching the load operation before the L1 cache update completes, reducing latency in serving the load operation when the L1 cache update completes by the time the load operation is re-dispatched by the manager of the load queue. Optionally, the L1 miss controller triggers re-dispatching the load operation in accordance with initiating the access to the next memory level after the L1 cache, to reduce latency between completion of the L1 cache update and re-dispatching the load operation by the manager of the load queue, reducing latency in serving the load operation.

In addition, in normal operation, the one or more second processing circuitries may access the memory system of the one or more processing circuitries, for example using the snoop access circuitry. Optionally, the system comprises a cache buffer for storing local data retrieved by accessing the memory system of the one or more processing circuitries, for example accessing the L1 cache, optionally before sending the retrieved data to the one or more second processing circuitries, and additionally or alternatively to a next memory level, for example a higher cache level.

In some embodiments described herewithin the present disclosure proposes using existing mechanisms for storing and updating data of a next memory level to update the L1 cache in case of address aliasing. Optionally, the L1 miss controller stores the data received from the snoop access circuitry in a buffer and optionally issues an L1 cache update, as for data retrieved from a next memory level. Optionally, the buffer is the cache buffer, for storing data retrieved from the memory system. Optionally, the buffer is a next level fill buffer, for storing data retrieved in normal operation from a next memory level. Optionally, the L1 miss controller selects whether to update the L1 cache using data retrieved from a next memory level or data from the buffer (for data retrieved from the L1 cache by the snoop access circuitry) according to the indication of the L1 aliasing snoop success. Optionally, the L1 miss controller triggers re-dispatching the load operation, optionally by indicating to the load queue that the L1 cache update completed. Optionally the L1 miss controller triggers re-dispatching the load operation by updating the status of the load operation on the load queue to indicate that the load operation may be dispatched. Triggering the re-dispatching of the load operation is optionally after invalidating the respective cache line in the L1 cache. Optionally, triggering the re-dispatching of the load operation is before completing update of the L1 cache with data received from the snoop access circuitry. In this case, if the load operation is dispatched before completing update of the L1 cache the load operation will result in a miss in the L1 cache. Optionally, the load operation will remain on the load queue to be re-dispatched again, one or more times until completion of updating the L1 cache with data received from the snoop access circuitry.

Optionally the respective cache line is invalidated by invalidating the old virtual tag in the L1 storage of virtual tags. Optionally, storing the data of the respective cache line in the other cache line, updating the L1 storage of physical tags and updating the L1 storage of virtual tags is in response to the L1 cache update. Using the cache buffer and issuing an L1 cache update allow using existing access ports to the L1 cache to update the L1 cache, without requiring additional dedicated hardware for accessing the L1 cache, reducing system complexity and cost of implementation.

In addition, to further reduce latency in some embodiments when the system comprises an L2 cache, the L1 miss controller optionally initiates an L2 access, i.e. an access to the L2 cache, concurrently with the L1 aliasing snoop, optionally using the physical tag value. Accessing the L2 cache in parallel to performing the L1 aliasing snoop reduces latency of serving the load operation when there is a genuine L1 cache miss and no address aliasing for the virtual address compared to accessing the L2 cache only after the L1 snoop access fails.

In addition, when the virtual tag value and the old virtual tag value indicate the same way in the same cache set (that is the virtual indexing according to the virtual address results in the same way that resulted in the L1 aliasing snoop hit), optionally the L1 miss controller updates the L1 storage of virtual tags with the virtual tag value. Optionally, the L1 miss controller refrains from storing the data in the buffer and instead triggers re-dispatching the load operation, optionally by issuing an L1 cache update, allowing the L1 access controller to serve the load operation using the data in the cache, further reducing latency of serving the load operation as there is no need to wait for another L1 cache update to be executed after storing data in the buffer. It should be noted that an L1 cache update or an alias snoop operation may remove blocking conditions preventing serving the load operation, and thus after L1 cache update or an alias snoop a load operation may be served using the same virtual address that was dispatched for an alias snoop operation or an L1 cache update.

Optionally, in this case, the L1 miss controller ignores an outcome of the L2 access, if one was initiated (in case of address aliasing in L1 cache there may be a physical hit in L2 cache.)

As cache coherent multiprocessor systems scale, the overhead of broadcasting snoop operations to all processor caches becomes increasingly inefficient. To address this issue, the present disclosure proposes, in some embodiments described herewithin additionally employing a 'snoop filter' mechanism that reduces unnecessary cache snooping operations. A snoop filter maintains compact information about the contents of each processor's cache, allowing the system to determine—before initiating a snoop operation—whether a particular cache might contain data corresponding to a specific physical memory address. By consulting the snoop filter first, the system can avoid directing snoop operations to caches that do not contain the relevant data, thereby reducing snoop traffic and improving system performance.

In the context of the hybrid cache architecture described herein, the snoop filter is particularly beneficial when performing aliasing snoops, as it allows the system to quickly determine whether a physical address corresponding to a virtual address might be present in the cache before initiating the more expensive cache lookup operation. The filter maintains sufficient information to identify potential matches while requiring significantly less storage space than would be needed to track exact cache contents.

Optionally, the L1 cache, the L1 access controller, the L1 miss controller, the snoop access circuitry, the buffer, the load operation queue, the translation circuitry, the snoop filter, or any combination thereof are implemented in a hardware processor comprising one of the one or more processing circuitries.

As used herewithin, the term reconfigurable processing grid refers to processing circuitry comprising a plurality of reconfigurable logical elements connected by a plurality of reconfigurable data routing junctions where the plurality of reconfigurable logical elements and additionally or alternatively the plurality of reconfigurable data routing junctions may be manipulated, in each of one or more iterations, to execute one or more operations. Optionally, at least one of the plurality of processing circuitries is implemented in a reconfigurable processing grid. Optionally, the L1 cache, the L1 access controller, the L1 miss controller, the snoop access circuitry, the buffer, the load operation queue, the translation circuitry, the snoop filter, or any combination thereof are implemented in a reconfigurable processing grid.

These embodiments provide technical improvements to cache memory system performance by differentiating addressing mechanisms based on memory operation type, enabling cache hardware to exploit distinct latency and coherency requirements of load versus store operations.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, at least one processing circuitry 101 is connected memory 190.

For brevity, henceforth the term "processing unit" is used to mean at least one processing circuitry and the terms are used interchangeably. The processing unit may be any kind of programmable or non-programmable circuitry that is configured to carry out the operations described above and below. The processing unit may comprise hardware as well as software. For example, the processing unit may further comprise a transitory or non-transitory memory that carries a program which causes the processing unit to perform the respective operations when the program is executed by the at least one processing circuitry. Optionally, the at least one processing circuitry are connected to the transitory or non-transitory memory.

Optionally, processing unit 101 is a member of a plurality of processing circuitries, optionally additionally comprising other processing unit 102.

Optionally, memory 190 comprises one or more physical memory storage entities to which application memory is mapped and can service a memory operation. In addition, memory 190 optionally comprises one or more memory access entities for accessing said one or more physical memory storage entities, and additionally or alternatively one or more memory management components used when accessing said one or more physical memory storage entities. Some examples of a memory storage entity include, but are not limited to, a random access memory bank, for example a high bandwidth memory (HBM) bank, a dynamic random-access memory (DRAM), a synchronous dynamic random-access memory (SDRAM), a cache memory, a cache bin, and a scratchpad. A scratchpad may be a static random access memory (SRAM). Some examples of a memory access entity include, but are not limited to, a HBM controller, a cache controller, a double data rate (DDR) controller and a DRAM controller providing access to a memory component. A cache memory may be at least part of a first level cache associated with a specific processing circuitry of the plurality of processing circuitries. A cache memory may be at least part of a higher level cache, associated with the specific processing circuitry. Optionally, a cache memory is at least part of a higher level shared cache distributed across multiple processing circuitries.

In this example, memory 190 comprises a lower level cache (L1 cache) 110 associated with processing unit 101. Optionally, memory 190 additionally comprises a higher level cache (L2 cache) 180, further from processing unit 101 than lower level cache 110 in a hierarchical caching architecture such that the L2 cache 180 is a next level memory in memory 190 with relation to L1 cache 110. Optionally, L2 cache 180 is distributed among the plurality of processing circuitries. Optionally, L2 cache 180 is configured to store a second plurality of cache lines. Optionally, L2 cache 180 comprises another storage of physical tags, henceforth L2 storage of physical tags. Optionally, each of the second plurality of cache lines is identified in the L2 storage of physical tags by another physical tag for both load operations and store operations.

Optionally, L1 cache 110 is configured to store a first plurality of cache lines, optionally storing the respective data of the first plurality of cache lines in plurality of data entries 115. Optionally, L1 cache 110 comprises a storage of virtual tags (L1 storage of virtual tags) and a storage of physical tags (L1 storage of physical tags) 112.

Optionally, processing unit 101 accesses L1 cache 110 using virtual tagging for load operations and using physical tagging for store (write) operations, such that each of the first plurality of cache lines is identified in the L1 storage of virtual tags by a first virtual tag value for load operations and in the L1 storage of physical tags by a first physical tag for store operations.

Optionally, L2 cache 180 is configured to store a second plurality of cache lines. Optionally, L2 cache 180 comprises another storage of physical tags, henceforth L2 storage of physical tags. Optionally, each of the second plurality of cache lines is identified in the L2 storage of physical tags by a second physical tag for both load operations and store operations.

Figures 2A, 2B:
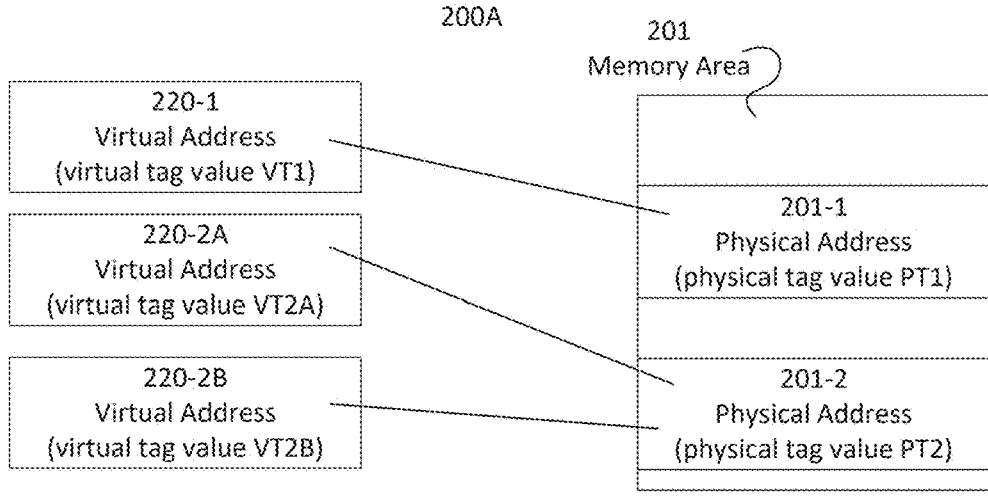
FIG. 2A is a block diagram of an exemplary mapping between virtual addresses and physical addresses, according to some embodiments.
FIG. 2B is a block diagram of an exemplary cache organization illustrating virtual and physical tag storage arrangements, according to some embodiments.

Reference is now made also to FIG. 2A, showing a block diagram of an exemplary mapping 200A between virtual addresses and physical addresses, according to some embodiments. In this example, memory area 201 is at least part of memory 190, addressed by a plurality of physical addresses comprising two physical addresses: physical address 201-1 and physical address 201-2. Optionally, physical address 201-1 is identified by physical tag value PT1. Optionally, physical address 201-2 is identified by physical tag value PT2.

Optionally, one or more virtual addresses are mapped to the plurality of physical memory addresses of memory area 201. For example, virtual address 220-1 may be mapped to physical address 201-1. Optionally, virtual address 220-1 is identified by virtual tag VT1.

In this example, physical address 201-2 has more than one virtual address mapped thereto, with both virtual address 220-2A and virtual address 220-2B mapped to physical address 201-2. This is an example of address aliasing.

Optionally, virtual address 220-2A is identified by virtual tag VT2A and virtual address 220-2B is identified by virtual tag VT2B.

Reference is now made also to FIG. 2B, showing a block diagram of an exemplary cache organization 200B illustrating virtual and physical tag storage arrangements, according to some embodiments. In such embodiments, the first plurality of cache lines are organized in a plurality of cache sets 230 comprising set0 though setN−1, where N represents the number of sets in the plurality of cache sets 230. Optionally, each of the plurality of cache sets comprises a plurality of cache ways 231. In this example, the plurality of ways comprises way0, way1, way2 and way3.

Optionally, each of the plurality of data entries 115 corresponds to a specific way of the plurality of ways 231 of a specific set of the plurality of cache sets 230. For brevity, the term "a cache line is stored in a way of a cache set" is used to mean that data of the cache line is stored in a data entry of the plurality of data entries 115 that corresponds to the way of the cache set.

Similarly, each of a plurality of virtual tag entries of L1 storage of virtual tags 111 optionally corresponds to a specific way of the plurality of ways 231 of a specific set of the plurality of cache sets 230 and stores a virtual tag value identifying the corresponding data entry in the plurality of data entries 115. Optionally, each of a plurality of physical tag entries of L1 storage of physical tags 112 corresponds to a specific way of the plurality of ways 231 of a specific set of the plurality of cache sets 230 and stores a physical tag value identifying the corresponding data entry in the plurality of data entries 115.

When a memory address comprises a sequence of binary bits, each of the plurality of cache sets 230 is optionally identified by a first subsequence of the sequence of binary bits. Optionally, a set of the plurality of cache sets 230, each of the plurality of cache ways 231 is identified by a second subsequence of the sequence of binary bits. For a virtual address, a valid entry in L1 storage of virtual tags, identified according to the virtual address, identifies a cache set and a way identifying a data entry storing data of a physical address corresponding to the virtual address. Optionally, a valid entry in L1 storage of physical tags, identified according to the physical address, identifies the same cache set and way.

In this example, cache line CL1 may correspond to physical address 201-1 to which virtual address 220-1 is mapped. In this example, data of CL1 is stored in a data entry corresponding to way1 of set0, and thus a first virtual tag entry of L1 virtual tag storage 111 corresponding to way1 of set0 stores the virtual tag value VT1 and a first physical tag entry of L1 physical tag storage 112 corresponding to way1 of set0 stores the physical tag value PT1.

Further in this example, another cache line CL2 may correspond to physical address 201-2 to which both virtual address 220-2A and virtual address 220-2B are mapped. In this example, data of CL2 is stored in another data entry corresponding to way3 of set2, and thus a second virtual tag entry of L1 virtual tag storage 111 corresponding to way3 of set2 stores the virtual tag value VT12B and a second physical tag entry of L1 physical tag storage 112 corresponding to way3 of set2 stores the physical tag value PT2.

Demonstrating the address aliasing problem, in this example trying to access physical address 201-2 using virtual address 220-2A mapped thereto will result in a virtual cache miss, as VT2A that identifies virtual address 220-2A is not stored in L1 storage of virtual tags, despite the corresponding data CL2 existing in the plurality of data entries 115.

In this example plurality of data entries 115, L1 storage of virtual tags 111 and L1 storage of physical tags 112 are depicted as three separate tables, each organized in rows corresponding to the plurality of cache sets 230 and columns corresponding to the plurality of ways 231. It should be noted that this depiction is used to provide a visual means of appreciating the relationship between these three components, however implementations may use other physical organizations of these elements while preserving the logical relationship among them.

Reference is now made again to FIG. 1. Optionally, memory 190 comprises load operation queue 120, optionally for receiving a plurality of load operations from processing unit 101. Optionally, memory 190 comprises lower cache access controller circuitry (L1 access controller) 121, for accessing L1 cache 110. Optionally, L1 access controller 121 accessing L1 cache 110 comprises using L1 storage of virtual tags. Optionally, L1 access controller 121 is connected to lower cache miss controller circuitry 123 (L1 miss controller), for handling cache misses when L1 access controller 121 accesses L1 cache 110. Optionally, memory 190 comprises snoop access circuitry 131, optionally to allow other processing unit(s) 102 to access L1 cache 110. Optionally, L1 miss controller 123 is connected to snoop access circuitry 131, optionally allowing the L1 mis controller 123 to access L1 cache 110 using L1 storage of physical tags.

Optionally, L1 cache 110 comprises a plurality of ports for accessing one or more of L1 storage of virtual tags 111, L1 storage of physical tags 112 and plurality of data entries 115. Optionally, L1 access controller 121 accesses L1 cache 110 using one or more ports of the plurality of ports when handling a first load operation received from load operation queue 120, concurrently to snoop access circuitry 131 accessing L1 cache 110 using one or more other ports of the plurality of ports.

Optionally, L1 cache miss controller 123 is connected to a snoop filter 132, maintaining information about contents of L1 cache 110.

Optionally, memory 190 comprises a buffer 181, optionally for storing data before storing the data in L1 cache 110. In normal operation, buffer 181 is optionally a next level fill buffer, used to store data retrieved from L2 cache 180 and additionally or alternatively from rest of memory 191. Optionally, in normal operation buffer 181 is a cache buffer used to store data retrieved from higher level cache 180 or rest of memory 191 before providing to other processing unit 102. In this example, rest of memory 191 comprises all components of memory 190 not explicitly described in the present disclosure. Additionally or alternatively, when handling address aliasing, buffer 181 may be used to store data retrieved by snoop access circuitry 131 from L1 cache 110.

Optionally, memory 190 comprises translation circuitry 125 for translating virtual addresses to physical addresses. The translation circuitry 125 may comprise a memory management unit (MMU). The translation circuitry 125 may be an MMU. Optionally, the translation circuitry 125 comprises a TLB.

Optionally, at least one of the plurality of processing circuitries is implemented in a reconfigurable processing grid. Optionally, any part of memory 190 is implemented in the reconfigurable processing grid.

Figure 3:
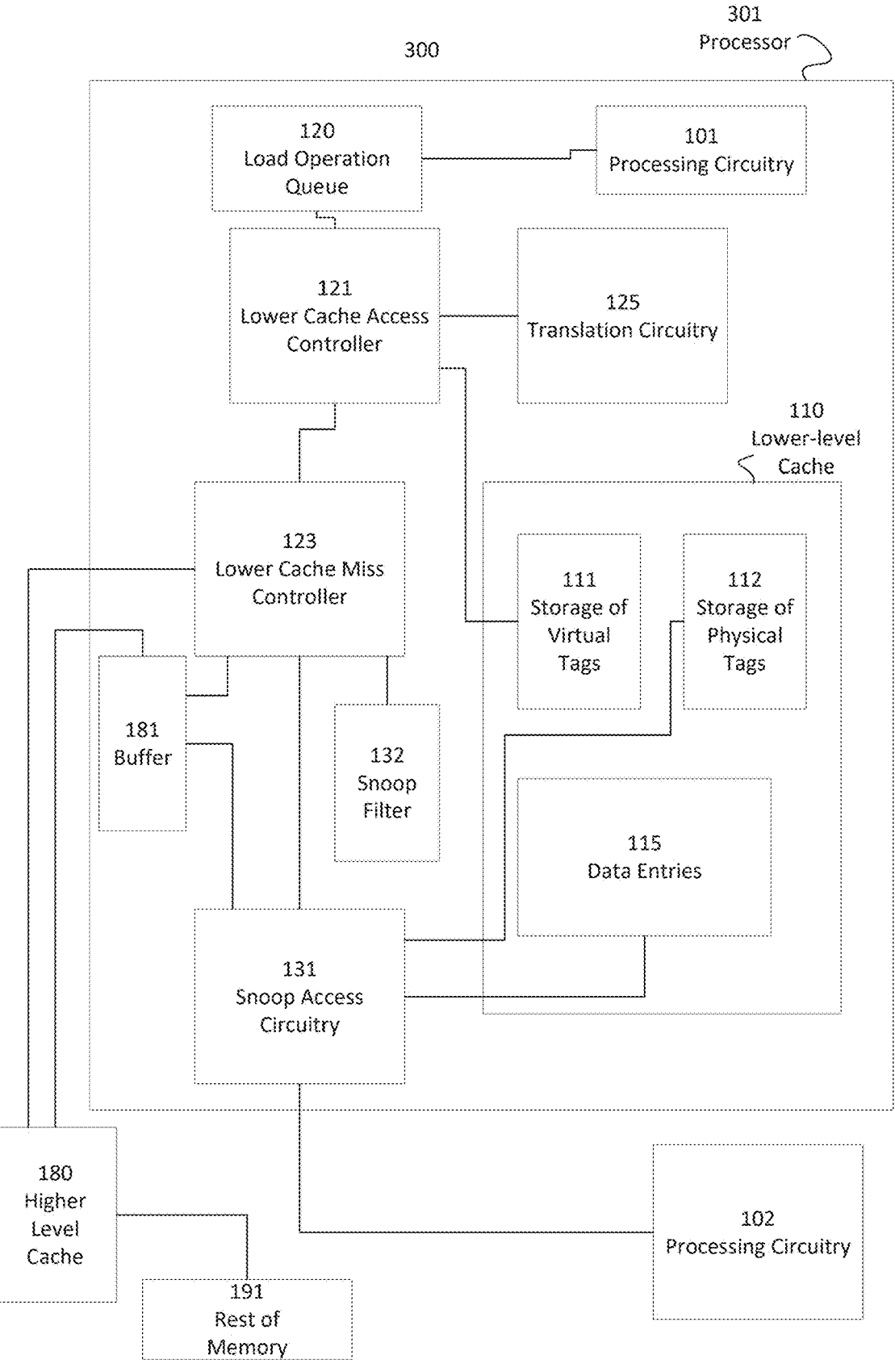
FIG. 3 is a schematic block diagram of another exemplary system, according to some embodiments.

Optionally, one or more parts of system 100 are implemented in a hardware processor. Reference is now made also to FIG. 3, showing a schematic block diagram of another exemplary system 300, according to some embodiments. In such embodiments, system 300 comprises processor 301. Optionally, processor 301 comprises processing circuitry 101, L1 cache 110, load operation queue 120, L1 access controller 121, translation circuitry 125, L1 miss controller 123, snoop access circuitry 131, snoop filter 132, buffer 181, or any combination thereof. Optionally, one or more of other processing circuitry 102, L2 cache 180 and rest of memory 191 are implemented external to processor 301.

To perform a load operation, in some embodiments system 100 or system 300 implement the following optional method.

Figure 4:
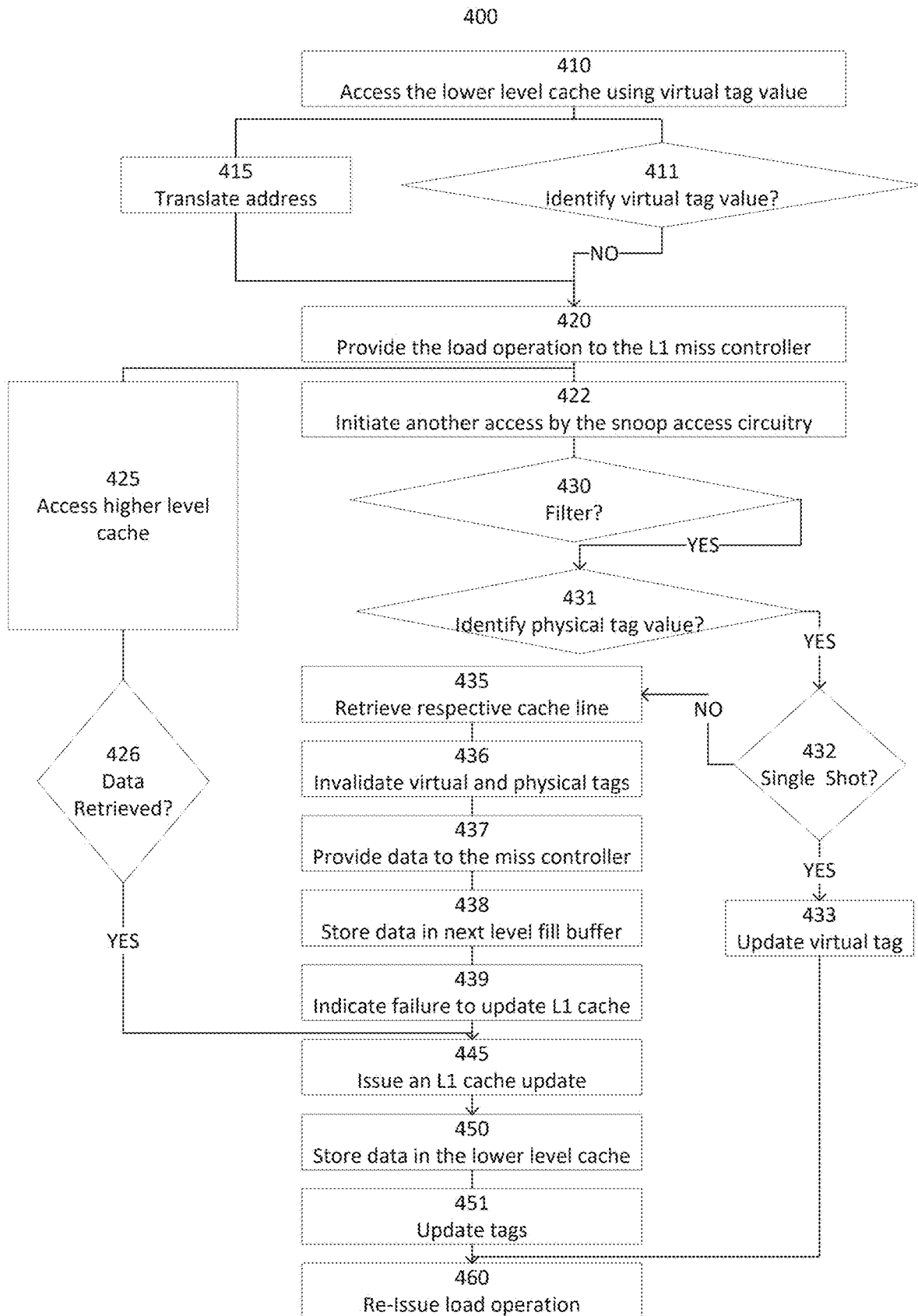
FIG. 4 is a flowchart schematically representing an optional flow of operations for a load operation, according to some embodiments.

Reference is now made also to FIG. 4, showing a flowchart schematically representing an optional flow of operations 400 for a load operation, according to some embodiments. In such embodiments, L1 access controller 121 receives a load operation from processing unit 101, optionally via load operation queue 120. Optionally, the load operation comprises virtual memory address 220-2A.

Optionally, in 410, L1 access controller 121 accesses L1 cache 110, optionally to perform the load operation. Optionally, L1 access controller 121 computes virtual tag value VT2A using virtual address 220-2A. Optionally, accessing the L1 cache comprises looking up virtual tag value VT2A in L1 storage of virtual tags 111.

Optionally, in 415 L1 access controller 121 computes physical address 201-2, optionally translating virtual address 220-2A, optionally using translation circuitry 125. Optionally, L1 access controller 121 computes physical address 201-2 concurrently to looking up virtual tag value VT2A in L1 storage of virtual tags 111.

In 411, L1 access controller 121 fails to identify virtual tag value VT2A in L1 storage of virtual tags 111, i.e. an L1 virtual miss. Upon the L1 virtual miss, in 420 L1 access controller 121 optionally provides the load operation to the L1 miss controller 123. Optionally, the L1 access controller 121 additionally provides the L1 miss controller 123 virtual tag value VT2A, and additionally or alternatively physical tag value PT2. Optionally, the L1 access controller 121 additionally provides the L1 miss controller a state of the load operation. Optionally, L1 access controller 121 computes physical tag PT2 using physical address 201-2.

In 422, L1 miss controller 123 initiates an L1 aliasing snoop, i.e. initializes another access to the L1 cache 110 by snoop access circuitry 131. Optionally, in 425, L1 miss controller 123 initiates an access to L2 cache using physical tag value PT2. Optionally, the L1 alias snoop performed by snoop access circuitry 131 and the access to L2 cache initiated in 425 are performed concurrently.

Optionally, snoop access circuitry 131 accesses L1 cache 110 using physical tag value PT2. Optionally, snoop access circuitry 131 computes physical tag value PT2 using physical address 202-2. Optionally, snoop access circuitry 131 computes physical address 202-2 using virtual address 220-2A.

Optionally, before accessing L1 cache 110, snoop access circuitry 131 computes an address identification value using physical address 201-2. Optionally, computing the address identification value comprises applying a hash function to the physical address 201-2. Optionally, snoop access circuitry 131 accesses L1 cache 110 using physical tag value PT2 subject to in 430 identifying the address identification value in the snoop filter storage 132.

In 431, snoop access circuitry 131 optionally identifies whether physical tag PT2 is in L1 storage of physical tags 112. Upon an L1 aliasing snoop success, i.e. a successful lookup of physical tag PT2 in the L1 storage of physical tags, in 432 the snoop access controller 131 determines whether there is a need to retrieve data from the L1 cache or whether it is sufficient to update the L1 storage of virtual tags 111, a condition henceforth referred to as single shot aliasing update. Single shot aliasing update is possible when virtual address 220-2B indicates the same way indicated by physical address 202-2. When, for example, virtual address 220-2A and virtual address 220-2B indicate different cache sets, single shot aliasing update is optionally not possible. However, when virtual address 220-2A and virtual address 220-2B indicate the same cache set, for example set2, when the way indicated by virtual address 220-2A in invalid, and additionally or alternatively when the way indicated by virtual address 220-2A stores virtual tag value VT2B (computed from virtual address 220-2B which is an alias of virtual address 220-2A, for example way3), in 433 the snoop access circuitry 131 optionally updates the L1 storage of virtual tags 111 (for example, way3 of set2) to identify CL2 by VT2A (computed from virtual address 220-2A of the load operation). When the plurality of cache sets are distributed among a plurality of logical banks, single shot aliasing update may be possible when virtual address 220-2A and virtual address 220-2B indicate the same cache set and the way indicated by virtual address 220-2B is in the same logical bank as another way indicated by physical address 202-2, even if not the exact same way indicated by virtual address 220-2A. Optionally, snoop access circuitry 131 indicates the L1 aliasing snoop success to L1 miss controller 123, optionally indicating a success to update the L1 cache 110.

When the conditions for single shot aliasing update are not identified, in 435 snoop access circuitry 131 optionally retrieves cache line CL2 from the cache line in the plurality of data entries 115 at way way3 of cache set set2, indicated by physical tag PT2. In 436, snoop access circuitry 131 optionally invalidates way3 of set2 in the L1 storage of virtual tags, optionally when VT2A (computed from virtual address 220-2A) is different from VT2B (optionally computed previously from virtual address 220-2B). Optionally, in 436 snoop access circuitry 131 additionally invalidates way 3 of set2 in the L1 storage of physical tags 112.

In 439, the snoop access circuitry 131 optionally indicates the L1 aliasing snoop success to L1 miss controller 123, optionally indicating a failure to update the L1 cache 110. Optionally, in response to the load operation, in 437 snoop access circuitry 131 provides data from CL2 to the L1 miss controller 123. Additionally or alternatively, in 437 snoop access circuitry 131 may provide cache line state information from CL2 to the L1 miss controller 123, optionally comprising an indication of a cache line state, for example according to the MESI protocol. Optionally, providing the data from CL2 to the L1 miss controller 123 comprises storing in 438 the data from CL2 in buffer 181.

When in 431 physical tag PT2 is not identified in L1 storage of physical tags 112 there is no aliasing, and handling the load operation continues with L1 miss controller 123 optionally identifying in 426 whether the L2 access of 425 retrieved other data.

Optionally, method 400 utilizes existing mechanisms for next level memory access to handle the aliasing. Thus, when there is a need to update the L1 cache 110 with new data, for example when the L2 access of 425 retrieved data or when the snoop controller circuitry 131 indicates an L1 aliasing snoop success with a failure to update the L1 cache 110, in 445 the L1 miss controller 123 optionally issues an L1 cache update. Optionally, in response to the L1 cache update, in

450 the L1 miss controller 123 stores new data in the L1 cache 110. Optionally, the L1 miss controller 123 takes the new data from the buffer 181, storing the data from CL2. Optionally, the L1 miss controller 123 additionally stores the cache line state information, provided by the snoop access circuitry 131, in the L1 cache 110. Optionally, the L1 miss controller uses the other data retrieved by the L2 access as the new data. When the snoop access circuitry 131 provides the L1 miss controller 123 with the data from CL2, the L1 miss controller 123 optionally ignores the other data retrieved by the L2 access. Optionally, the new data is stored in another cache line, different from the cache line of way way3 in set set2 that stored CL2. Optionally, the other cache line is selected according to physical tag value PT2. When the snoop access circuitry 131 provides the L1 miss controller 123 with the cache state information from CL2, the L1 miss controller optionally stores the cache state information in the L1 cache optionally in response to the L1 cache update.

In 451, the L1 miss controller 123 optionally updates the L1 storage of physical tags 112 to identify the other cache line by PT2. Additionally, or alternatively, in 451 the L1 miss circuitry 123 optionally updates the L1 storage of virtual tags 111 to identify the other cache line by VT2A, computed using virtual address 220-2A of the load operation.

In 460 the L1 miss controller 123 optionally triggers re-dispatching the load operation, optionally including setting a priority indication for the load operation in the load queue 120. Optionally, 460 is executed after L1 cache 110 stores data for responding to the load operation. Optionally, 460 is executed before L1 cache 110 stores data for responding to the load operation. Optionally, when the load operation is actually re-dispatched, the load operation is served using the data stored in L1 cache 110.

Optionally, when executing method 400 in response to the re-dispatched load operation, in 411 the L1 access controller 121 identifies the virtual tag VT2A in the L1 storage of virtual tags 111 and responds to the load operation.

According to method 400, when the L1 aliasing snoop fails and in 431 the snoop access circuitry 131 fails to identify the physical tag PT in the L1 storage of physical tags 112, the L1 cache 110 is optionally updated according to an outcome of the L2 access of 425, and thus the response to the load operation is optionally according to the outcome of the L2 access of 425.

To perform a store operation, in some embodiments system 100 or system 300 implement the following optional method.

Figure 5:
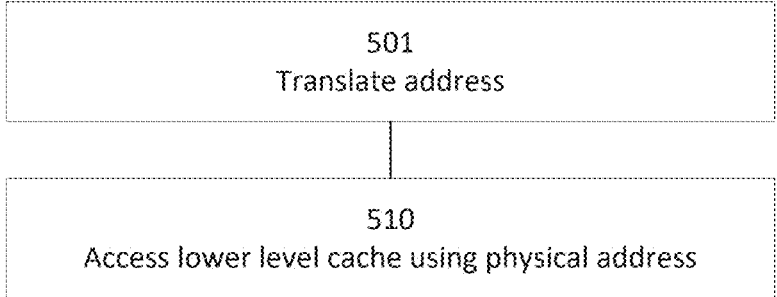
FIG. 5 is a flowchart schematically representing an optional flow of operations for a store operation, according to some embodiments.

Reference is now made also to FIG. 5, showing a flowchart schematically representing an optional flow of operations 500 for a store operation, according to some embodiments. In such embodiments, when L1 access controller 121 receives a store operation comprising virtual address 220-2A, in 501 L1 access controller 121 translates virtual address 220-2A to physical address 201-2, optionally using translation circuitry 125.

In 510, L1 access controller 121 optionally accesses L1 cache 110. To prevent coherency issues in case of address aliasing, optionally L1 access controller 121 accesses L1 cache 110 using physical indexing and physical tagging. To do so, L1 access controller 121 optionally computes physical tag value PT2 using physical address 201-2. Optionally, L1 access controller 121 accesses L1 cache 110 using physical tag value PT2, optionally accessing L1 storage of physical tags 112.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant caches will be developed and the scope of the term cache is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computing system comprising:
a lower level (L1) cache associated with at least one first processing circuitry, configured to store a first plurality of cache lines and comprising a storage of virtual tags (L1 storage of virtual tags) and a storage of physical tags (L1 storage of physical tags), where each of the first plurality of cache lines is identified for load operations by a first virtual tag in the L1 storage of virtual tags and for store operations by a first physical tag in the L1 storage of physical tags;
a lower cache access controller circuitry (L1 access controller), configured to access the L1 cache by the at least one first processing circuitry;
a snoop access circuitry associated with the at least one first processing circuitry, configured to access the L1 cache by at least one second processing circuitry; and
a lower cache miss controller circuitry (L1 miss controller);
wherein the L1 access controller is further configured to, in response to receiving from the at least one first processing circuitry a load operation comprising a virtual memory address:
access the L1 cache (L1 access) to perform the load operation comprising looking up in the L1 storage of virtual tags a virtual tag value computed using the virtual memory address; and
upon failing to identify the virtual tag value in the L1 storage of virtual tags (L1 virtual miss), provide the load operation to the L1 miss controller; and
wherein the L1 miss controller is configured to, in response to receiving the load operation from the L1 access controller, initiate another access to the L1 cache by the snoop access circuitry (L1 aliasing snoop), the L1 aliasing snoop comprising looking up in the L1 storage of physical tags a physical tag value computed using a first physical memory address corresponding to the virtual memory address.

2. The computing system of claim 1, wherein the L1 access controller is further configured to provide the L1 miss controller with the virtual tag value and the physical tag value.

3. The computing system of claim 1, wherein the snoop access circuitry is further configured to, upon a successful look up of the physical tag value in the L1 storage of physical tags (L1 aliasing snoop success):

retrieve from the L1 cache a respective cache line iden-
    tified by the physical tag value; and
  provide data from the respective cache line to the L1 miss
    controller.

4. The computing system of claim 3, wherein the snoop access circuitry is further configured to invalidate the respective cache line in the L1 storage of virtual tags and in the L1 storage of physical tags.

5. The computing system of claim 3, wherein the L1 miss controller is further configured to:

store the data of the respective cache line in another cache
    line of the first plurality of cache lines of the L1 cache,
    where the other cache line is selected according to a
    cache management policy;
  update the L1 storage of physical tags to identify the other
    cache line by the physical tag value; and
  update the L1 storage of virtual tags to identify the other
    cache line by the virtual tag value computed using the
    virtual memory address of the load operation.

6. The computing system of claim 5, wherein the other cache line, selected according to the cache management policy, is the respective cache line.

7. The computing system of claim 5, wherein the system further comprises a buffer, for storing local data retrieved by accessing the L1 cache, before sending the local data to at least one other processing circuitry;

wherein providing the data from the respective cache line
    to the L1 miss controller comprises storing the data in
    the buffer;
  wherein the snoop access circuitry is further configured to
    indicate to the L1 miss controller a failure to update the
    L1 cache;
  wherein the L1 miss controller is further configured to
    issue a lower level cache update (L1 cache update) in
    response to the indication from the snoop access cir-
    cuitry failing to update the L1 cache;
  wherein storing the data of the respective cache line in the
    other cache line, updating the L1 storage of physical
    tags and updating the L1 storage of virtual tags is in
    response to the L1 cache update.

8. The computing system of claim 1, further comprising a higher level (L2) cache, configured to store a second plurality of cache lines and comprising another storage of physical tags (L2 storage of physical tags), where each of the second plurality of cache lines is identified for both load and store operations by another physical tag in the L2 storage of physical tags and where the L2 cache is a next level memory with relation to the L1 cache;

wherein the L1 miss controller is further configured to
    initiate an access to the L2 cache (L2 access) using the
    physical tag value, concurrently with the L1 aliasing
    snoop.

9. The computing system of claim 1, wherein an L1 aliasing snoop success comprises identifying the physical tag value in a location in the L1 storage of physical tags.

10. The computing system of claim 9, wherein the snoop access is further configured to, in response to the L1 aliasing snoop success, update the L1 storage of virtual tags to identify the respective cache line by the virtual tag value computed using the virtual memory address of the load operation.

11. The computing system of claim 10, wherein the first plurality of cache lines is organized in the L1 storage of virtual tags in a plurality of cache sets each cache set comprising a plurality of ways;

wherein identifying the virtual tag value in the L1 storage
    of virtual tags comprises identifying an association
    between the virtual tag value and an identified way of
    the respective plurality of ways of an identified cache
    set of the plurality of cache sets; and
  wherein the snoop access circuitry is configured to update
    the L1 storage of virtual tags subject to identifying that
    the location in the L1 storage of physical tags where the
    physical tag value was identified corresponds to the
    identified way associated with the virtual tag value.

12. The computing system of claim 1, wherein the L1 access controller is further configured to, upon an unsuc-cessful look up of the physical tag value in the L1 storage of physical tags when executing the L1 snoop access, respond to the load operation according to an outcome of another access to a next memory level after the L1 cache.

13. The computing system of claim 1, further comprising a load operation queue for storing one or more pending load operations;

wherein the L1 access controller is configured to receive
    the load operation from the load operation queue; and
  wherein the L1 aliasing snoop to the L1 cache is per-
    formed concurrently with the L1 access controller
    accessing the L1 cache in response to another load
    operation received from the load operation queue.

14. The computing system of claim 1, further comprising a translation circuitry configured to translate virtual memory addresses to physical memory addresses;

wherein the first physical memory address is computed by
    the translation circuitry using the virtual memory
    address.

15. The computing system of claim 14, wherein the translation circuitry is a memory management unit.

16. The computing system of claim 1, wherein the computing system further comprises a snoop
    filter storage comprising a plurality of filter entries,
    each filter entry of the plurality of filter entries corre-
    sponding to one of the first plurality of cache lines; and
  wherein performing the L1 aliasing snoop is subject to:
    computing an address identification value using the
      first physical memory address; and
    identifying the address identification value in the snoop
      filter storage.

17. The computing system of claim 16, wherein comput-ing the address identification value comprises applying a hash function to the first physical memory address.

18. The computing system of claim 1, wherein the L1 access controller is further configured to:

in response to a store operation comprising the virtual
    memory address, access the L1 cache to perform the
    store operation using the physical tag value computed
    using the first physical memory address.

19. A method for memory caching, comprising:

receiving from at least one first processing circuitry a load
    operation comprising a virtual memory address,
  accessing a lower level (L1) cache associated with at least
    one first processing circuitry to perform the load opera-
    tion, where the L1 cache is configured to store a first
    plurality of cache lines and comprises a storage of
    virtual tags (L1 storage of virtual tags) and a storage of physical tags (L1 storage of physical tags), where each of the first plurality of cache lines is identified for load operations by a first virtual tag in the L1 storage of virtual tags and for store operations by a first physical tag in the L1 storage of physical tags, where performing the load operation comprises looking up in the L1 storage of virtual tags a virtual tag value computed using the virtual memory address;

upon failing to identify the virtual tag value in the L1 storage of virtual tags (L1 virtual miss), providing the load operation to a lower cache miss controller circuitry (L1 miss controller), otherwise, upon identifying the virtual tag value, data is received directly from the cache; and initiating by the L1 miss controller another access to the L1 cache (L1 aliasing snoop) by a snoop access circuitry, the L1 aliasing snoop comprising looking up in the L1 storage of physical tags a physical tag value computed using a first physical memory address corresponding to the virtual memory address.

20. A processor comprising:

a lower level (L1) cache associated with at least one first processing circuitry, configured to store a first plurality of cache lines and comprising a storage of virtual tags (L1 storage of virtual tags) and a storage of physical tags (L1 storage of physical tags), where each of the first plurality of cache lines is identified for load operations by a first virtual tag in the L1 storage of virtual tags and for store operations by a first physical tag in the L1 storage of physical tags;

a lower cache access controller circuitry (L1 access controller), configured to access the L1 cache by the at least one first processing circuitry;

a snoop access circuitry associated with the at least one first processing circuitry, configured to access the L1 cache by at least one second processing circuitry; and a lower cache miss controller circuitry (L1 miss controller);

wherein the L1 access controller is further configured to, in response to receiving from the at least one first processing circuitry a load operation comprising a virtual memory address:

access the L1 cache (L1 access) to perform the load operation comprising looking up in the L1 storage of virtual tags a virtual tag value computed using the virtual memory address; and upon failing to identify the virtual tag value in the L1 storage of virtual tags (L1 virtual miss), provide the load operation to the L1 miss controller, and wherein the L1 miss controller is configured to, in response to receiving the load operation from the L1 access controller, initiate another access to the L1 cache (L1 aliasing snoop) by the snoop access circuitry, the L1 aliasing snoop comprising looking up in the L1 storage of physical tags a physical tag value computed using a first physical memory address corresponding to the virtual memory address.

\* \* \* \* \*